July 21, 1931.　　　A. DE MADALER　　　1,815,694
SYNCHRONOUSLY OPERATED MOTION PICTURE AND SOUND REPRODUCTION APPARATUS
Original Filed Nov. 5, 1927　　3 Sheets-Sheet 1
FIG. 1
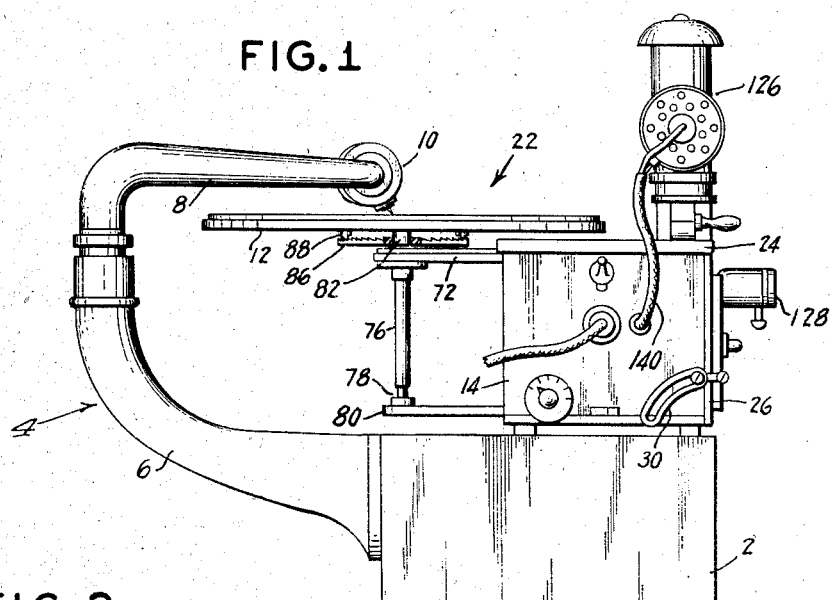
FIG. 2
FIG. 4
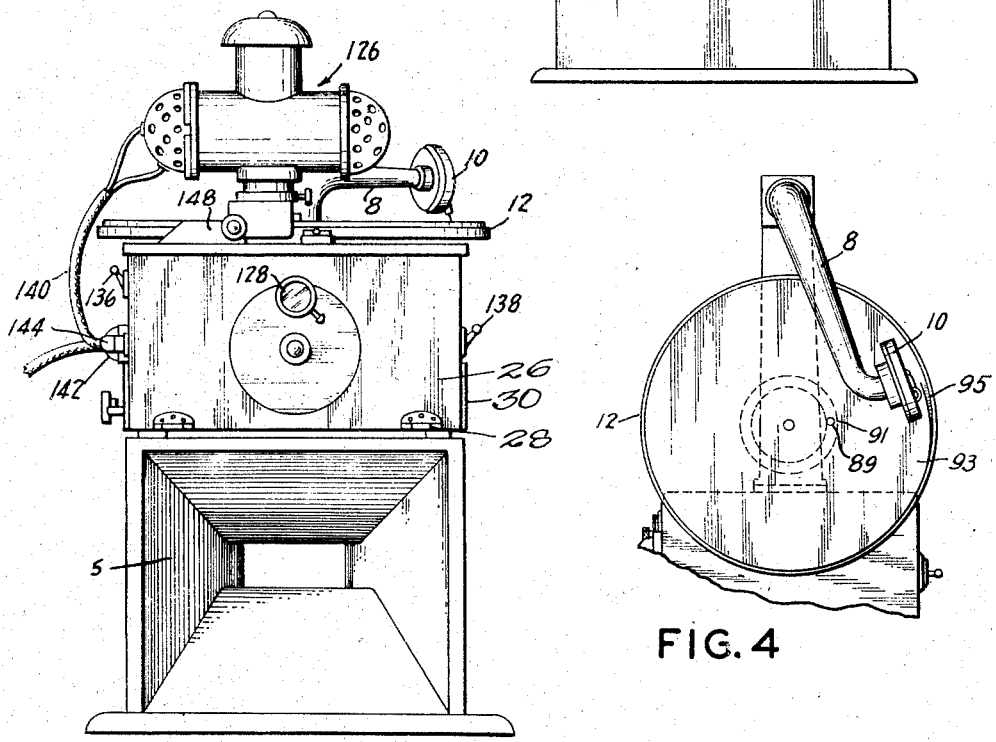
INVENTOR
Arthur De Madaler
BY
VanDeventer + Simmons
his ATTORNEYS.

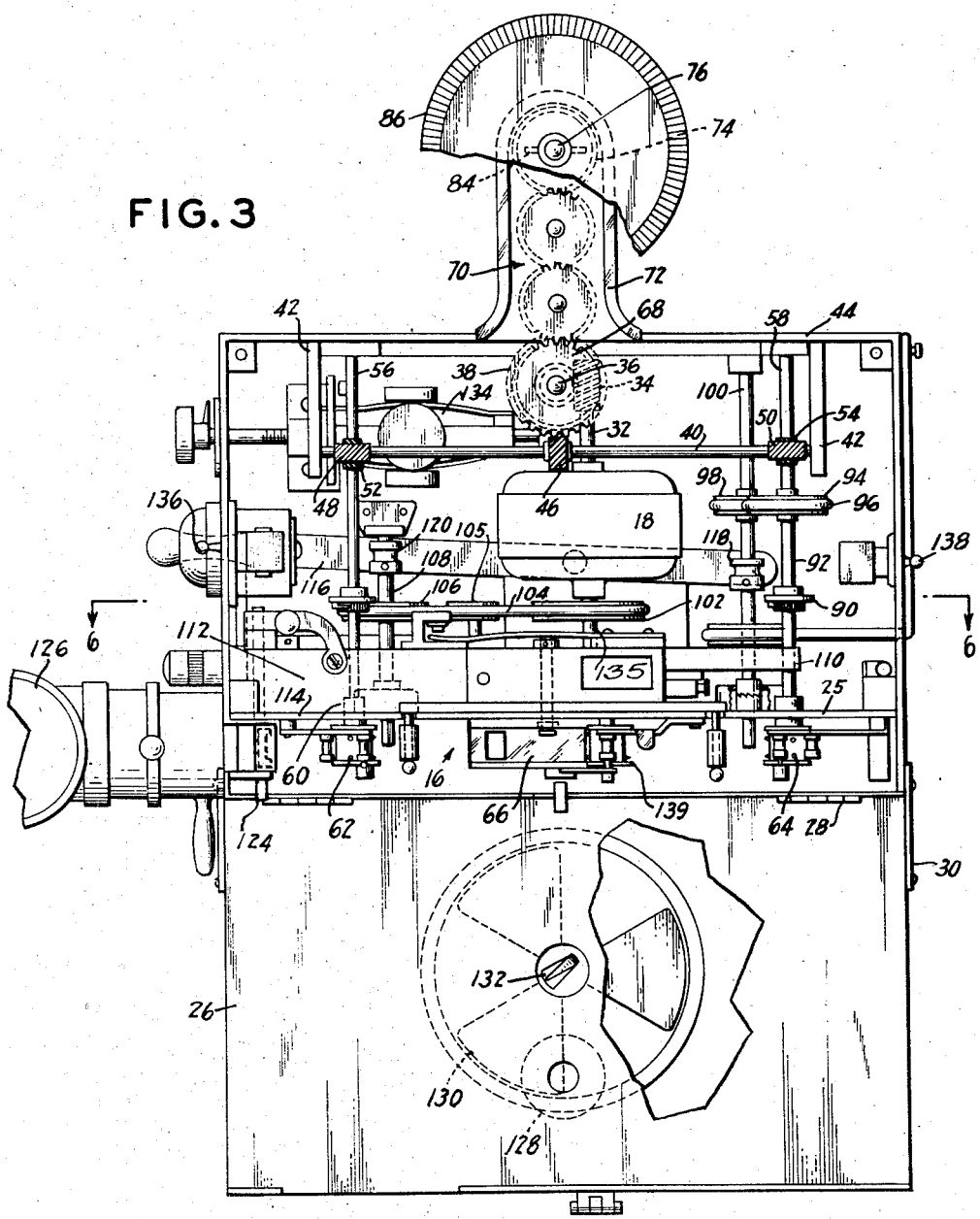

July 21, 1931.  A. DE MADALER  1,815,694
SYNCHRONOUSLY OPERATED MOTION PICTURE AND SOUND REPRODUCTION APPARATUS
Original Filed Nov. 5, 1927   3 Sheets-Sheet 3

INVENTOR
Arthur De Madaler
BY
VanDeventer & Simmons
his ATTORNEYS.

Patented July 21, 1931

1,815,694

UNITED STATES PATENT OFFICE

ARTHUR DE MADALER, OF HAMPTON BAYS, NEW YORK, ASSIGNOR, BY MESNE ASSIGNMENTS, TO VISIONOLA MFG. CORPORATION, OF NEW YORK, N. Y., A CORPORATION OF DELAWARE

SYNCHRONOUSLY OPERATED MOTION PICTURE AND SOUND REPRODUCTION APPARATUS

Original application filed November 5, 1927, Serial No. 231,362. Divided and this application filed December 6, 1928, Serial No. 324,075. Renewed June 27, 1930.

This invention relates to talking moving picture apparatus.

It is an object of this invention to provide an arrangement whereby the production of the features commonly known as "talking" moving pictures may be produced easily and simply.

It is an additional object of this invention to provide apparatus of the character described, compactly housed, and simply constructed, in such manner, that the entire arrangement lends itself for use in the home, or any other place, where skill and prior knowledge of the theory of operation of such apparatus is at a premium.

It is an additional object of this invention to provide a portable projection unit, and to arrange that unit in connection with a support of desirable contour so that a sound reproducer, mounted on said support, will be driven synchronously with the picture reproducer.

It is a further object of this invention to arrange a device of the character described, in which novel means are involved for synchronizing the sound reproducer with respect to the operation of the projection apparatus.

It is a further object of this invention to provide an assembly, including a sound reproducer and a projection apparatus, in which common drive means is utilized for said sound reproducer and said projection apparatus, and in which a film rewinding means is provided, and operated by the same power means.

This application is a division of application Ser. No. 231,362, filed November 5, 1927. Certain features of novelty, shown and described herein are shown, described and claimed in said application, and in application Ser. No. 324,076, filed Dec. 6, 1928, filed simultaneously herewith and are therefore not claimed herein.

With the exception of the objects of invention, necessarily included in said copending application, and in addition to the objects set forth above, other objects of the invention herein described will be in part obvious and in part hereinafter pointed out.

The invention accordingly consists in the features of construction, combinations of elements, and arrangement of parts which will be exemplified in the constructions hereinafter described, and of which the scope of application will be indicated in the following claims.

In the accompanying drawings, in which are shown some of the various possible illustrative embodiments of this invention.

Fig. 1 is a side elevational view of an apparatus, embodying my invention.

Fig. 2 is a front elevational view of said apparatus.

Fig. 3 is a plan view of said apparatus, the turntable being removed, the top of the cabinet being opened, the light source ordinarily positioned thereon being swung to one side, and the front door being positioned in the horizontal position it assumes when film is to be changed, or for like operations, parts being broken away to clarify the disclosure.

Fig. 4 is a plan view of said apparatus, the top and said turntable being shown in position with a record thereon.

Figure 5:
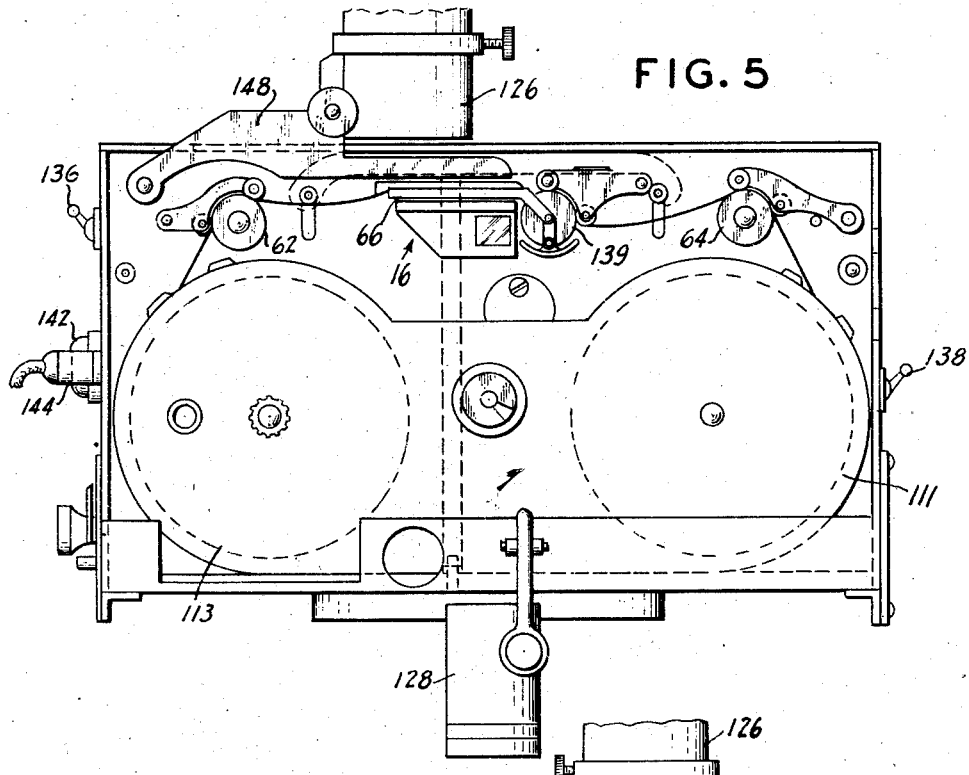
Fig. 5 is a front elevational view of said apparatus, with the front door thereof swung downward.
Figure 6:
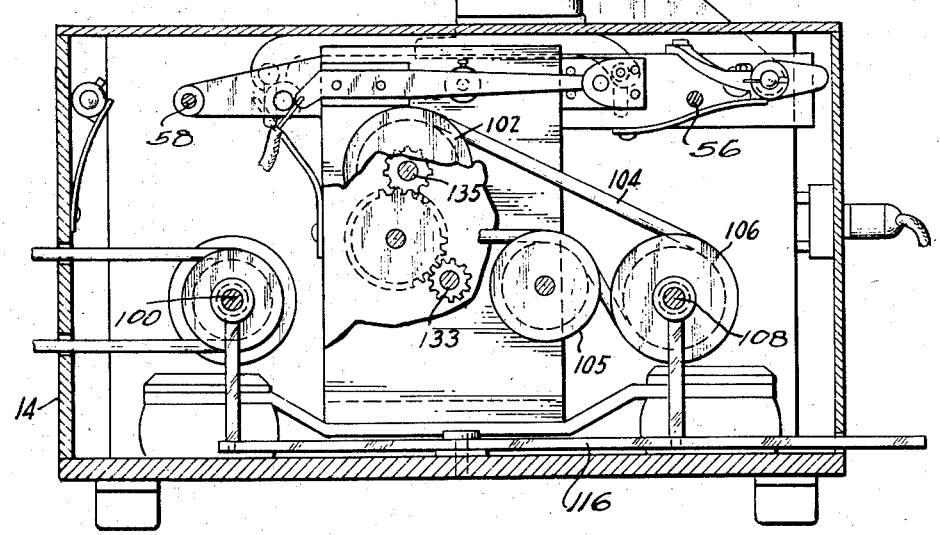
Fig. 6 is a longitudinal sectional view on the line 6—6 of Fig. 3.

On the drawings, a casing 2 is seen to support the unitary projector and sound reproducer 4, said casing 2 being formed to provide any suitable sound directive device, such as the horn 5, with which is coupled the conduit 6, leading to the tone arm 8, with which is connected the reproducer element 10. Reproducer element 10 may be positioned in the well known manner to cooperate with a sound record or the like carried by the turntable 12 and suitably arranged in the manner hereinafter appearing, for fixed relation with said turntable.

Unitary apparatus 4 is seen to comprise a cabinet 14, within which are housed the elements of the motion picture projection apparatus 16, the power means 18 therefor, and the drive means therefrom for the sound reproducer 22. The top cover 24 of the cabinet 14 is suitably hinged for movement so that access may be had to the interior of the said cabinet for repair purposes or the like. The front door 26 of said cabinet likewise is hinged at 28 for movement forwardly, and downwardly, into a position substantially horizontal, in which position it is retained by means of the guide and stopping arrangement 30. Door 26 carries certain features of the projection apparatus 16, which will be hereinafter described.

The power means 18 may be of any suitable character for the purposes indicated; it is herein shown as an electric motor, the driven shaft 32 of which extends in opposite directions therefrom. On one side, said shaft by means of a worm and worm wheel connection 34, drives the vertical shaft 36, upon the upper end of which is mounted the helical gear 38. A shaft 40, extending transversely of shaft 32, and in the plane of gear 38, is bearinged within the bracket arms 42, which extend forwardly from the rear wall 44 of cabinet 14. Shaft 40 carries the complementary helical gear 46 which meshes with gear 38 to drive said shaft. The helical gears 48 and 50 carried on shaft 40 mesh with the respective complementary helical gears 52 and 54 on the respective transverse shafts 56 and 58. Each of shafts 56 and 58 has a bearing formed in the rear wall 44, the shafts then extending forwardly through the bearing support 60 which is mounted on the rear face of panel 25. The sprockets 62 and 64, by means of which film for the projector apparatus is fed through the gate 66, mounted on said panel are carried on the ends of shafts 56 and 58.

Mounted above the helical gear 38 on the shaft 36, is a gear 68, the first gear of a train 70, housed within a gear casing 72. Said casing is suitably mounted on and relative to the external face of rear wall 44, and extends away therefrom toward the conduit 6. The last gear 74 of the train 70 is mounted upon a vertically extending shaft 76, which passes through the bottom of casing 72 to be received in a suitable step bearing 78 which is carried by the support 80, extending from rear wall 44. Mounted on the upper end of shaft 76, as for instance on a shoulder 82, formed at the upper end of said shaft, is the turntable 12. Said turntable is rotatable relative to said shaft, but in the manner hereinafter appearing, is restrained against movement in one direction.

On a portion of shaft 76, intermediately positioned between the turntable 12 and the gear 74 is removably mounted, as by the pin and slot arrangement 84, the gear or ratchet wheel 86. The pawls 88, arranged on the bottom of the turntable 12 are designed to be brought into operative engagement with the teeth of said wheel, or they will slip over said teeth when it is desired, for instance, to rotate turntable 12 forwardly, without interference or assistance by driven gear 74. By this arrangement when it is necessary to position a record on said table, in a particular relation to the stylus of the reproducer element 10, the table may, when the power means 18 is not operating, be rotated, in the direction of ordinary travel, to bring the record into proper relation with said stylus.

In this relation, it is noted that turntable 12 may have an upwardly extending member or pin 89, to be engaged in a notch 91 cut in the record 93, whereby the record will be positively positioned, relatively to the turntable 12, and therefore, the drive means herein described, for synchronizing the operation of said record with said projection apparatus, in relation to a starting groove 95 on said record.

It is further noted that the turntable 12 cannot be rotated in a reverse direction, because of the cooperation of the pawls 88 with the teeth of the wheel 86. Further, when it is desired to dismount the parts of the sound reproducer, for any reason, the turntable is easily lifted off shaft 76, after which the shaft with the wheel 86, the gear 74, and the associated parts attached may be slid through the opening in the casing 72, and out of the step bearing 78.

Transverse shafts 56 and 58 are not solid shafts, but are split intermediately, and are provided with the ratcheting clutches 90, so constructed that the sprockets 62 and 64 may be moved, without the action of the power means 18, in a forwardly direction, but may not be moved in a reverse direction, all of this being possible without interfering with the efficiency of the driving connection to the power means 18. Furthermore, there is mounted on the shaft 58, a pulley 94 over which is trained a belt 96 which is operatively connected with pulley 98, mounted on a shaft 100. In like manner, the driven shaft 32 of the power means 18 has a pulley 102 thereon, by means of which a belt 104, extending over an idler pulley 105, transmits power to a pulley 106, mounted upon another transverse shaft 108. Shafts 100 and 108 are suitably bearinged and have their forward ends formed with a coupling member housed within casings 110 and 112, within which is also housed in each case complementary coupling member. Each of said complementary coupling members is secured on the end of a shaft of the respective film reels 111 and 113, mounted within the space between the panel 114 and the door 26, in the manner more particularly described in said copending application Ser. No. 231,362. A lever 116, pivotally mounted on the base of cabinet 14 is pivotally connected to the collars 118 and 120, which are mounted on the shafts 100 and 108. When the lever 116 is moved, the collars 118 and 120 will move their associated shafts and thereby positively couple one of the shafts 100 and 108 individually, to the respective reels, above described, at the same time uncoupling the other reel from connection with the respective shaft. In this manner, reel 111 is positively driven by the power means 18, for taking up films, fed through the sprockets 62 and 64 over the gate 66, and through the intermittent feeding arrangement, more fully described in connection with said application Ser. No. 231,362, and in copending application Ser. No. 324,076; or, by positioning the film, as described in detail in the latter application, the film is rewound upon reel 113.

Pivotally mounted within cabinet 14, upon the pin 124, and at one side thereof, for movement over the top of said cabinet and down over the side thereof, is the light source 126, which when mounted over the top of the cabinet, will be positioned to direct light downwardly to the gate 66, over which the film will be passed. The light by means of a light directive arrangement, more particularly described in copending application, Ser. No. 324,076, is then passed to the objective lenses 128, first however being properly regulated in the well known manner by a shutter 130. Said shutter is rotated by a spring member 132, which when the door 26 is closed, engages a portion of a drive shaft 133, driven from shaft 135 which is the forward end of motor drive shaft 32, and is also utilized in supplying power to a Geneva or other intermittent motion device whereby the sprocket 139 is driven to feed film intermittently past gate 66, as is more fully disclosed in said application Ser. No. 231,362.

Any suitable governor 134 may be provided, properly connected with power means 18 to regulate the speed thereof, in the well known manner of such devices. At the side walls of the cabinet 14 may be mounted the switches 136 and 138, by means of which the light source 126 and power means 18 may be controlled. It is noted that the light source 126 is connected by means of a flexible cable 140 and a plug connection 142, with the stationary contact portion 144 on the side wall of the cabinet 14, so that the light source, when desired, may be removed entirely from connection with the cabinet 14, after the removal of the pin 124. Any suitable stop may be provided, in connection with the bracket 148, upon which the light source is mounted, for limiting movement of said source relative to the top of the cabinet 14.

It can thus be seen that there has been provided a unitary assembly in which is cooperatively brought together a sound reproducer and a motion picture projector, assembled with a unitary drive, for synchronous action, the arrangement being such that the parts thereof are readily accessible, in the manner pointed out above.

In this relation, therefore, there have been provided devices in which the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense. Also, features shown, whether described or not, and not comprehended within the scope of the accompanying claims are included in claims in copending applications.

I claim:

1. In a machine for reproducing motion pictures and sound in synchronism, the combination with a base, a motor mounted thereon having a drive shaft, a vertical shaft connected to said drive shaft, a turntable mounted for rotation thereon, a panel mounted vertically on said base, picture projection apparatus mounted adjacent said panel including film feeding mechanism and reels for said film mounted on the front of said panel so as to be separated from the turntable and drive mechanism therefor, operating shafts extending therefrom and connections from said operating shafts to said drive shaft.

2. In a machine for reproducing motion pictures and sound in synchronism, the combination comprising a turntable, a motor, operating connections from said motor to said turntable and including coacting members permitting freedom of movement of the turntable in one direction without interfering with the operating connection, whereby the turntable may be manually rotated to bring the same in synchronism with said picture apparatus when starting the machine, motion picture projection apparatus, operating connections therefrom to said motor and including a clutch, means for actuating the clutch at will.

3. A machine for reproducing motion pictures and sound in synchronism comprising, in combination, a motor, a supporting base, a shaft rotatably mounted on said base and operatively connected to said motor, a ratchet wheel carried by said shaft, a sound record carrier loosely mounted on said shaft, a pawl mounted on said carrier so as to cooperate with said ratchet to rotate the carrier when said shaft is operated but permitting free rotation of the turntable in one direction only when the shaft is at rest, and motion picture projection apparatus operatively connected to said motor, and so arranged that the film may be positioned to start at a predetermined point, whereby the illusion of talking motion pictures is produced when the sound record carrier and film are operated concurrently.

4. In a machine for reproducing motion pictures and sound in synchronism, the combination with a base, a motor, a phonograph turntable mounted on the base, and operatively connected to the motor, a panel mounted on said base, a picture projection apparatus mounted adjacent said panel comprising a lens system mounted on the panel, a light source mounted on one side of the panel, film reeling and winding mechanism mounted on the opposite side of said panel, said panel forming a partition between the film handling mechanism and the sound reproducing apparatus, and operative connections from the projection apparatus to said motor.

5. In a machine for reproducing motion pictures and sound in synchronism, the combination with a base, a motor, a phonograph turntable mounted on the base and operatively connected to the motor, a panel mounted on said base, picture projection apparatus mounted adjacent said panel comprising film feeding and take-up reels rotatably mounted on one side of the panel and parallel thereto so as to be separated from the phonograph turntable, film feeding mechanism operatively connected to said motor and mounted in the plane of the reels so as to feed the film across said panel from one reel to the other.

6. A machine for reproducing motion pictures and sound in synchronism and compactly arranged to be readily portable as a unit comprising, in combination, a motor, a supporting base, a shaft rotatably mounted on said base and operatively connected to said motor, a sound record carrier mounted on said shaft, picture projection apparatus carried by said base and comprising film feeding mechanism, operating gears therefor, operating connections mounted on said base between said gears and motor, a take-up reel mounted at one side of said feeding mechanism, an operating shaft for said reel rotatably mounted on said base, a flexible operating connection between the motor and said reel shaft, a second reel, and a light source and lens system all also carried by said base and movable as a unit.

7. A machine for reproducing motion pictures and sound in synchronism and compactly arranged to be readily portable as a unit comprising, in combination, a motor, a supporting base, a shaft rotatably mounted on said base and operatively connected to said motor, a sound record carrier mounted on said shaft, picture projection apparatus carried by said base and comprising film feeding mechanism, operating gears therefor, operating connections mounted on said base between said gears and motor, a take-up reel mounted at one side of said feeding mechanism, an operating shaft for said reel rotatably mounted on said base, a flexible operating connection between the motor and said reel shaft, a second reel, a shaft therefor, operating connections therefrom to said motor including a movable clutch whereby the second reel may be selectively driven so as to rewind the film, and a light source and lens system all also carried by said base.

8. A combination sound and picture reproduction apparatus, single power means therefor, a drive connection for said sound apparatus from said power means and including means capable of driving operation in one direction only, whereby the turntable may be manually rotated to bring the same in synchronism with said picture apparatus when starting the machine, and disconnectible means for transmitting power from said power means to said picture reproduction apparatus.

9. In sound and light reproduction apparatus a panel; a base; sound reproduction apparatus comprising a shaft and turntable mounted on said base; light production apparatus comprising an operating shaft, film feeding mechanism and feeding and take-up reels; a motor; operating connections from said motor to the respective shafts; the light reproduction apparatus being so mounted with respect to said panel that the film feeding and reeling mechanism is separated from the sound reproducing apparatus and the drive mechanism.

10. In a machine for reproducing motion pictures and sound in synchronism, the combination with a base, a motor mounted thereon having a drive shaft, a vertical shaft connected to said drive shaft, a turntable mounted for rotation therewith, a panel mounted at one side of said base, picture projection apparatus mounted on said panel including a pair of reels mounted adjacent the ends of said panel, film feeding means therebetween, said panel separating the film handling mechanism from the sound reproducing apparatus, and a gate for the reception of the film, a light source and lens system cooperating with said gate, the parts being so arranged that the film will be fed across the panel from adjacent one end to adjacent the other end of said panel, and operating connections from said projection apparatus to said motor.

11. In a machine for reproducing motion pictures and sound in synchronism, the combination with a base, a motor, a phonograph turntable mounted on the base and operatively connected to the motor, a panel mounted on said base, picture projection apparatus mounted adjacent said panel comprising film feeding and take-up reels rotatably mounted on one side of the panel and parallel thereto, film feeding mechanism operatively connected to said motor and mounted between said reels and operating in the same plane as said reels so as to feed the film from one reel to the other, said panel arranged to form a partition between said turntable and said picture projection apparatus.

12. A machine for reproducing motion pictures and sound in synchronism comprising the combination with a motor; a supporting base; a shaft rotatably mounted on said base and operatively connected to said motor, and a sound record carrier mounted on said shaft, of picture projection apparatus comprising film feeding mechanism; operating connections between the film feeding mechanism and the motor, a take-up reel mounted at one side of said feeding mechanism, an operating connection between said reel and motor including a movable clutch, a second reel, an operating connection therefrom to said motor also including a movable clutch, a control lever, connections from said lever to both of said clutches to enable the control lever to actuate said clutches simultaneously but oppositely to drive either reel independently of the other, and a light source and lens system, and means forming a separate compartment for the film handling mechanism from the phonograph mechanism.

13. A machine for reproducing motion pictures and sound in synchronism comprising the combination with a motor; a supporting base; a shaft rotatably mounted on said base and operatively connected to said motor, and a sound record carrier mounted on said shaft, of picture projection apparatus comprising film feeding mechanism; operating connections between the film feeding mechanism and the motor, a take-up reel mounted at one side of said feeding mechanism, an operating connection between said reel and motor, a second reel, an operating connection therefrom to said motor, and means to alternately render said driving connections inoperative so that either reel is operative independently of the other, and a light source and lens system, and means forming a separate compartment for the film handling mechanism from the phonograph mechanism.

In testimony whereof I affix my signature.

ARTHUR DE MADALER.